April 11, 1961 J. A. RICKARD 2,979,618
HELIUM 3 LOGGING METHOD
Filed Dec. 7, 1956

INVENTOR.
JAMES A. RICKARD,
BY
*John J. Schneider*
ATTORNEY.

United States Patent Office 2,979,618
Patented Apr. 11, 1961

2,979,618

HELIUM 3 LOGGING METHOD

James A. Rickard, Houston, Tex., assignor, by mesne assignments, to Jersey Production Research Company, Tulsa, Okla., a corporation of Delaware Filed Dec. 7, 1956, Ser. No. 626,881

1 Claim. (Cl. 250—83.1)

This invention concerns a method for determining the nature of subsurface formations by radioactive measurements. More particularly, this invention concerns a method wherein the energy of induced secondary radiation produced by bombarding subsurface formations with primary radiation is measured in order to obtain an indication of the characteristics of the subsurface formations.

Knowledge of the general nature of subsurface formations can be obtained by noting generally the effect of the formations on incident (primary) radiation. However, a much greater knowledge of the nature of the subsurface formations may be obtained by measurement of the energy of induced (secondary) particles produced by primary radiation. Certain substances, when bombarded by primary radiation, emit characteristic secondary radiation. Since the radiation from different substances may be identical in all respects except energy, a measurement of energy is essential to identify such substances in the formation. My copending U. S. Patent application, Serial No. 504,835, now Patent No. 2,789,605, issued April 23, 1957, entitled "Method of Well Logging," filed April 29, 1955, describes a method and suitable apparatus for use therewith for detecting and measuring the energy of induced secondary radiation in order to determine the presence and amounts of substances contained in subsurface formations.

A process whereby the energy of various neutrons is measured is termed generally "neutron spectroscopy." Measuring the energy of the neutrons is difficult because of the manner in which neutrons interact with matter. That is, neutrons do not continuously ionize atoms as they penetrate matter; instead they penetrate relatively large distances in matter with no loss of energy and then suddenly participate in some reaction and thereby lose all or part of their energy. Neutrons are detected only through their reaction products. The reaction products are charged and thus ionize matter. The presence and energy of the reaction products may be measured by instruments well known to the art such as proportional counters and scintillation counters.

For purposes herein, the two important reactions in which neutrons participate are elastic scattering and neutron-proton (n,p) reactions.

In elastic scattering, a neutron strikes a motionless nucleus and gives up to the nucleus a varying portion of its energy. Elastic scattering may be compared to billiard ball collisions. The detecting process measures the energy of the recoiling nucleus. As with billiard balls, the recoiling nucleus may have all or any fraction of the original energy of the incident particles. Thus, a number of neutrons with the same energy would produce recoil nuclei with a variety of energies. A measurement of the energy of the recoiling nucleus would not be a measure of the energy of the incident neutron.

In the (n,p) process, an incident neutron enters the nucleus of an atom and a proton is ejected. The energy of the proton is representative of the chemical element and the original energy of the neutron. The detection process measures the energy of the proton plus the energy (which is usually small) of the residual nucleus. The (n,p) process results in protons which have energy directly proportional to the incident neutron energy. A number of monoenergetic neutrons, for example, would all produce protons of the same energy. In practice it is difficult to employ the (n,p) reaction because it is almost impossible for the detection process to distinguish between protons resulting from an (n,p) reaction and recoil nuclei resulting from an elastic scattering process.

Methods have been formulated in attempts to effect distinguishment of the two processes. For example, it has been proposed to apply a complicated mathematical treatment to the neutron spectrum, in order to do neutron spectroscopy on elastic collision events. However, the application of such method is difficult and cumbersome to handle.

Also, it has been proposed to do neutron spectroscopy utilizing the (n,p) reactions by differentiation between the proportional counter pulse produced by the short, heavily ionized track of the recoil nucleus and the pulse produced by the relatively long, weakly ionized track of the proton. However, the pulse form depends upon the geometric relationship between the proton path and the pulse collector, and since protons can be emitted at any angle, pulses of any shape can be produced. Hence this method does not achieve desired distinction between the two processes.

Accordingly, one object of this invention is to provide a method for accomplishing neutron spectroscopy by measuring the energy of reaction products of the incident neutrons. A further object of this invention is to utilize the (n,p) reaction:

(1) 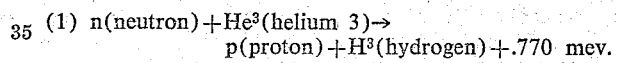

and to distinguish the (n,p) reaction from the elastic scattering process by means of the energy differences inherent in the two methods.

Briefly, this invention comprises a method for obtaining neutron spectra comprising detecting neutrons, producing electrical pulses proportional in amplitude to the energy of said neutrons, and then selecting pulses of amplitudes representative of energies of neutrons undergoing (n,p) reactions.

Referring briefly to the drawings.

Figure 1:
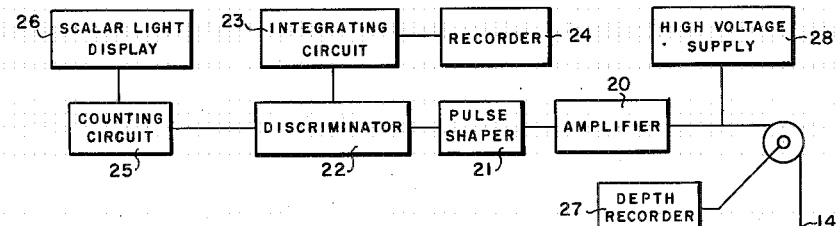
Fig. 1 is a plot of number of recoil nuclei having a given energy (E) versus energy of recoil nuclei for monoenergetic undergoing elastic scattering process only.
Figure 1:
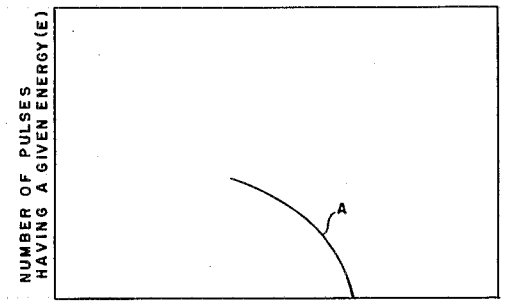

Thus, Fig. 1 illustrates the variation in the energy of the recoil nuclei caused by elastic scattering of neutrons of the given energy (curve A).

When neutrons bombard $He^3$, protons are produced through the (n,p) reaction as noted in the above-reaction (1). The secondary particles have an energy equal to the neutron energy plus .770 mev. The reaction is:

(2) 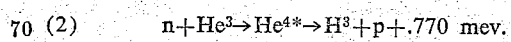

wherein $He^{4*}$ symbolizes helium 4 in an excited state.

Figure 2:
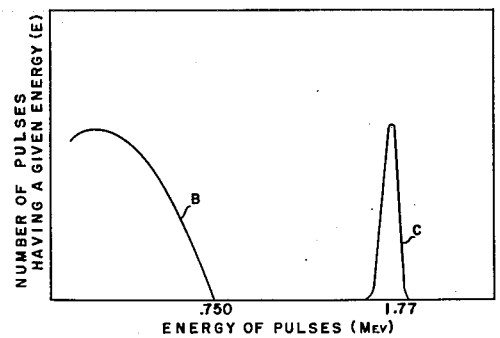
Fig. 2 is a plot of the number of pulses having a given energy (E) versus the energy of pulses for monoenergetic neutrons undergoing both elastic scattering and (n,p) processes wherein the incident neutron energy equals 1 mev.

Referring to Fig. 2, it is seen (curve C) that reacting a neutron of 1 mev. energy with He³, for example, produces a proton and a triton (hydrogen 3), whose combined energy is 1.77 mev. Neutron bombardment of helium 3 also produces helium 3 recoils by elastic scattering; however, because of the mechanics of the scattering reaction, the maximum energy of the recoil helium 3 nucleus is three-fourths the energy of the incident neutron. Thus, neutrons of 1 mev. energy produce helium 3 recoils having energies between 0 and .750 (curve B).

Figure 3:
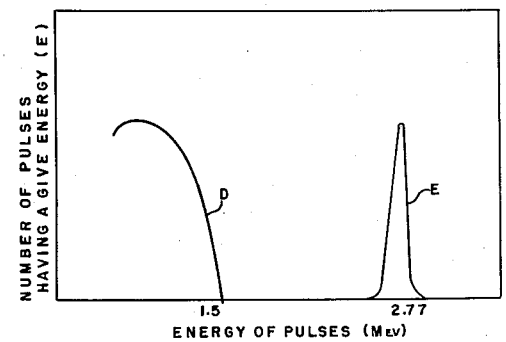
Fig. 3 is a plot of the number of pulses having a given energy (E) for neutrons undergoing both elastic scattering and (n,p) processes wherein the incident neutron energy equals 2 mev.

Fig. 3, similarly to Fig. 2, shows graphically the combined energy of a proton and a triton as 2.77 mev. (curve E) and the energy of the recoil helium 3 nucleus as between 0 and 1.5 mev. for incident neutron energy of 2 mev. These two figures illustrate a large difference exists between the energy of secondary radiation products of the (n,p) reactions and the energy of the secondary radiation resulting from elastic scattering. This energy difference provides an easy method for distinguishing these processes.

Figure 4:
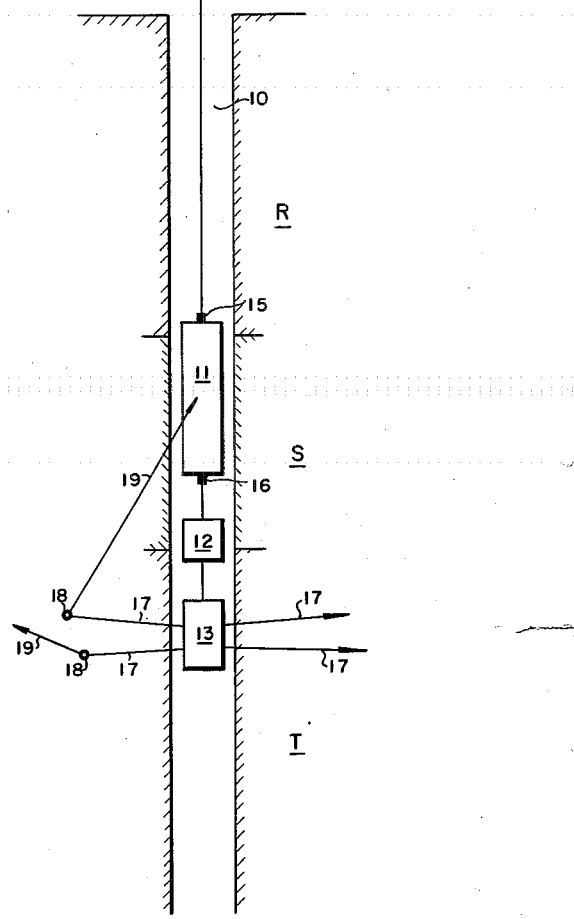
Fig. 4 is a schematic representation of the subsurface and surface apparatus adapted for use with my invention.

For a discussion of the operation of my method in greater detail, reference is now made to Fig. 4 wherein is shown a borehole 10 penetrating a plurality of subsurface formations R, S and T. The down-the-hole equipment includes a proportional counter 11, a shield 12, and a neutron source 13 positioned on an electrically conductive cable 14, which extends to the surface of the earth as shown. The proportional counter 11 contains helium 3. In addition to helium 3, the counter 11 may also contain gases, such as argon or neon. The proportional counter is insulated as at 15 and 16 respectively. The shield 12 is provided to insure that radiation emitted from source 13 is not detected by the proportional counter 11 until after penetration of the subsurface formations is effected.

The surface equipment includes an amplifier 20, a pulse shaper 21, and a discriminator 22. An integrating circuit 23 and a recorder 24 may be connected to the discriminator, or a counting circuit 25 and a scalar light display 26 may be employed as shown. In addition, other conventional methods of obtaining the spectrum of electrical pulses may be used. A depth recorder 27 may be employed to record the depth of the down-the-hole instrumentation. A high voltage supply 28 is connected to the electrically conductive cable 14.

In operation neutrons emitted from the neutron source 13, which source may be natural sources, such as Ra-Be or Po-Be sources, or accelerator sources, penetrate the formation as indicated by the arrowed line 17 in Fig. 4. In the formation the neutrons participate in nuclear reactions indicated as at 18 resulting in the emission of secondary neutrons 19, which neutrons are characteristic of the formation. Some of the secondary neutrons 19 penetrate the helium 3 filled counter 11 and therein undergo elastic collison or (n,p) process reaction. The reaction products ionize the counter gas, and the electrical charge produced thereby is collected on the center wire of the proportional counter caused by an electrical potential applied thereto. The collected charge constitutes an electrical pulse which is conducted by the cable 14 to the earth's surface, amplified by amplifier 20, shaped by the pulse shaper 21, accepted or rejected by discriminator 22, and then either counted and displayed on light display 25 and 26, respectively, or integrated as designated at 23 and recorded on recorder 24.

The energy pulse selected is determined by the discriminator. The setting of the discriminator is dependent upon what substance or substances are to be observed. For example, a few typical reactions which produce secondary neutrons are:

(3) $n(5.4 \text{ mev.}) + C^{12} \rightarrow C^{13*} \rightarrow$
$n'(1.0 \text{ mev.}) + C^{12} + \gamma(4.4 \text{ mev.})$ (4) $n(10.6 \text{ mev.}) + C^{12} \rightarrow C^{13*} \rightarrow$
$n'(1.0 \text{ mev.}) + C^{12} + \gamma(9.6 \text{ mev.})$ (5) $n(7.1 \text{ mev.}) + O^{16} \rightarrow O^{17*} \rightarrow$
$n'(1.0 \text{ mev.}) + O^{16} + \gamma(6.1 \text{ mev.})$ (6) $n(8.0 \text{ mev.}) + O^{16} \rightarrow O^{17*} \rightarrow$
$n'(1.0 \text{ mev.}) + O^{16} + \gamma(7.0 \text{ mev.})$ (7) $n(3.3 \text{ mev.}) + N^{14} \rightarrow N^{15*} \rightarrow$
$n'(1.0 \text{ mev.}) + N^{14} + \gamma(2.3 \text{ mev.})$ It is to be noted that if $n$ has an increased energy, $n'$ also increases the same amount. For example, reaction 3 above may be rewritten as:

(8) $n(6.5 \text{ mev.}) + C^{12} \rightarrow C^{13*} \rightarrow$
$n'(2.0 \text{ mev.}) + C^{12} + \gamma(4.4 \text{ mev.})$ (9) $n(7.4 \text{ mev.}) + C^{12} \rightarrow C^{13*} \rightarrow$
$n'(3.0 \text{ mev.}) + C^{12} + \gamma(4.4 \text{ mev.})$ In the above reactions:

$n$ = a primary neutron
$n'$ = induced reaction product secondary neutrons
$\gamma$ = gamma rays
$*$ = an excited state The isotopes of chemical elements are conventionally indicated. For example, $C^{12}$ = carbon 12, and $C^{13}$ = carbon 13. As indicated previously, the * indicates an excited state.

Having fully described the objects and operation of my invention, I claim:

A method of logging a borehole to ascertain the presence and amounts of chemical isotopes contained in subsurface formations by neutron spectroscopy comprising the steps of bombarding the subsurface formations with primary radiation, producing induced neutrons in said subsurface formations by said bombardment, the energies of said induced neutrons being indicative of chemical isotopes present in said subsurface formations, reacting fast induced neutrons resulting from said bombardment returned to the borehole with helium 3 to produce elastic scattered helium 3 recoil particles and (n,p) reaction products of protons and tritons, selectively detecting only the combined energies of said protons and tritons resulting from said (n,p) reactions in a selected energy range, and recording the intensities of said detected energies to indicate amounts of said chemical isotopes.

References Cited in the file of this patent

UNITED STATES PATENTS

| | | |
|---|---|---|
| 2,483,139 | Herzog | Sept. 27, 1949 |
| 2,508,772 | Pontecorvo | May 23, 1950 |
| 2,543,676 | Thayer et al. | Feb. 27, 1951 |
| 2,712,081 | Fearon et al. | June 28, 1955 |
| 2,785,315 | Goodman | Mar. 12, 1957 |

OTHER REFERENCES

Batchelor et al.: Review of Scientific Instruments, vol. 26, No. 11. November 1955, pp. 1037–1047.